(12) United States Patent
Zhang et al.

(10) Patent No.: US 11,102,461 B1
(45) Date of Patent: Aug. 24, 2021

(54) PROJECTION SYSTEM, PROJECTION METHOD, AND PROJECTION DISPLAY SYSTEM

(71) Applicant: TPK Touch Systems (Xiamen) Inc., Fujian (CN)

(72) Inventors: Ning Zhang, Putian (CN); Xiao Xin Bai, Fujian (CN); Qi Jun Zheng, Xiamen (CN); Yan Jun Xie, Xiamen (CN); Kwan Sin Ho, Toufen (TW)

(73) Assignee: TPKTouch Systems (Xiamen) Inc., Xiamen (CN)

( * ) Notice: Subject to any disclaimer, the term of this patent is extended or adjusted under 35 U.S.C. 154(b) by 0 days.

(21) Appl. No.: 17/030,453

(22) Filed: Sep. 24, 2020

(51) Int. Cl.
| | |
|---|---|
| *G06T 7/70* | (2017.01) |
| *H04N 9/31* | (2006.01) |
| *G06F 3/041* | (2006.01) |
| *H04B 1/06* | (2006.01) |
| *G06F 3/0484* | (2013.01) |
| *G06F 3/0488* | (2013.01) |
| *H04B 1/02* | (2006.01) |

(52) U.S. Cl.
CPC ........... *H04N 9/3185* (2013.01); *G06F 3/041* (2013.01); *G06T 7/70* (2017.01); *H04N 9/3194* (2013.01); *G06F 3/0488* (2013.01); *G06F 3/04847* (2013.01); *H04B 1/02* (2013.01); *H04B 1/06* (2013.01)

(58) Field of Classification Search
CPC ........ H04N 13/246; G06T 2207/10016; G06T 7/70; G06T 7/80; H04B 17/23; H04B 17/309; H04B 17/318
See application file for complete search history.

(56) References Cited

U.S. PATENT DOCUMENTS

| 9,497,380 B1 * | 11/2016 | Jannard | H04N 5/23238 |
| 2015/0138086 A1 * | 5/2015 | Underkoffler | G06K 9/00375 345/158 |
| 2017/0359129 A1 * | 12/2017 | Saito | H04B 17/318 |
| 2019/0191146 A1 * | 6/2019 | Koyama | H04N 5/23212 |

\* cited by examiner

*Primary Examiner* — Paulos M Natnael
(74) *Attorney, Agent, or Firm* — Cooper Legal Group, LLC

(57) ABSTRACT

A projection system includes a projection device including a projector unit and a camera unit, a signal transmitter unit mounted to a projection screen, and a processing unit. The camera unit captures an image of a projection image projected by the projector unit onto the projection screen, and the processing unit obtains a position of the projection image accordingly. The processing unit obtains a position of the projection screen based on signals wirelessly transmitted by the signal transmitter unit and adjusts setting parameter(s) related to the projector unit based on a comparison between the positions of the projection image and the projection screen to reduce dimensional and/or positional differences between the two.

13 Claims, 3 Drawing Sheets

PROJECTION SYSTEM, PROJECTION METHOD, AND PROJECTION DISPLAY SYSTEM

FIELD

The disclosure relates to a projection system, and more particularly to a projection system that uses wireless signals to calibrate a projected image. The disclosure further relates to a projection method implemented by the projection system, and a projection display system including the projection system.

BACKGROUND

In modern society, projection devices are often used in lectures, speeches, meetings, presentations and other situations. The projection device can be used to project various information on a projection screen, which not only effectively assists the speaker in conveying information but also makes it easier for the audience to understand the information presented by the speaker.

When a projection device is in use, it is necessary to ensure that the image projected by the projection device matches the projection screen. More specifically, the position and size of the projected image must match those of the projection screen as closely as possible in order to obtain the best projection effect. However, once the relative positions of the projection device and the projection screen change, the projected image will no longer match the projection screen, and the user will have to readjust the placement or parameters of the projection device, causing inconvenience in use.

SUMMARY

Therefore, an object of the disclosure is to provide a projection system that can alleviate the inconvenience of the conventional projection system.

According to the disclosure, the projection system is for use with a projection screen, and includes a projection device, a signal transmitter unit, and a processing unit. The projection device includes a projector unit, a camera unit, and a signal receiver unit. The signal transmitter unit is configured to be mounted to the projection screen. The processing unit is electrically connected to the projector unit, the camera unit, and the signal receiver unit. The processing unit is configured to acquire, from the camera unit when the projector unit is projecting a projection image onto the projection screen, an image capturing result generated by the camera unit capturing an image of the projection image on the projection screen and to generate an image position data piece that indicates a position of the projection image based on the image capturing result. The processing unit is further configured to wirelessly receive multiple transmitter signals from the signal transmitter unit via the signal receiver unit and to generate a screen position data piece that indicates a position of the projection screen based on the transmitter signals. The processing unit is further configured to generate a calibration data piece based on a comparison between the image position data piece and the screen position data piece. The calibration data piece indicates at least one of a dimensional difference or a positional difference between the projection image and the projection screen. The processing unit is further configured to adjust at least one setting parameter that is related to the projector unit based on the calibration data piece, so as to reduce the at least one of the dimensional difference or the positional difference between the projection image and the projection screen.

Another object of the disclosure is to provide a projection method to be implemented by the projection system of this disclosure.

According to this disclosure, the projection system includes a projection device, a signal transmitter unit configured to be mounted to a projection screen, and a processing unit, and the projection device includes a projector unit electrically connected to the processing unit, a camera unit, and a signal receiver unit. The projection method includes an image positioning step, a screen positioning step, and an image calibration step. The image positioning step includes: by the processing unit, acquiring, from the camera unit when projecting a projection image onto the projection screen, an image capturing result generated by the camera unit capturing an image of the projection image on the projection screen, and generating an image position data piece that indicates a position of the projection image based on the image capturing result. The screen positioning step includes: by the processing unit, wirelessly receiving multiple transmitter signals from the signal transmitter unit via the signal receiver unit, and generating a screen position data piece that indicates a position of the projection screen based on the transmitter signals. The image calibration step includes: by the processing unit, generating a calibration data piece based on a comparison between the image position data piece and the screen position data piece, where the calibration data piece indicates at least one of a dimensional difference or a positional difference between the projection image and the projection screen; and, by the processing unit, adjusting at least one setting parameter that is related to the projector unit based on the calibration data piece, so as to reduce the at least one of the dimensional difference or the positional difference between the projection image and the projection screen.

Yet another object of the disclosure is to provide a projection display system that includes the projection system of this disclosure.

A projection display system includes a projection device, a projection screen, a signal transmitter unit, and a processing unit. The projection device includes a projector unit, a camera unit, and a signal receiver unit. The signal transmitter unit is mounted to the projection screen. The processing unit is electrically connected to the projector unit, the camera unit, and the signal receiver unit.

The processing unit is configured to acquire, from the camera unit when the projector unit is projecting a projection image onto the projection screen, an image capturing result generated by the camera unit capturing an image of the projection image on the projection screen, and to generate an image position data piece that indicates a position of the projection image based on the image capturing result.

The processing unit is further configured to wirelessly receive multiple transmitter signals from the signal transmitter unit via the signal receiver unit, and to generate a screen position data piece that indicates a position of the projection screen based on the transmitter signals.

The processing unit is further configured to generate a calibration data piece based on a comparison between the image position data piece and the screen position data piece. The calibration data piece indicates at least one of a dimensional difference or a positional difference between the projection image and the projection screen.

The processing unit is further configured to adjust at least one setting parameter that is related to the projector unit based on the calibration data piece, so as to reduce the at least one of the dimensional difference or the positional difference between the projection image and the projection screen.

The effect of this disclosure resides in that the processing unit of the projection system can generate the calibration data piece based on the image position data piece and the screen position data piece and automatically adjust the setting parameter(s) of the projection device based on the calibration data piece, so as to reduce at least one of the position difference or the dimensional difference between the projection image and the projection screen. Accordingly, even if relative positions of the projection device and the projection screen change, the projection system can automatically calibrate the projection image to fit the projection screen and does not require the user to make adjustments manually.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
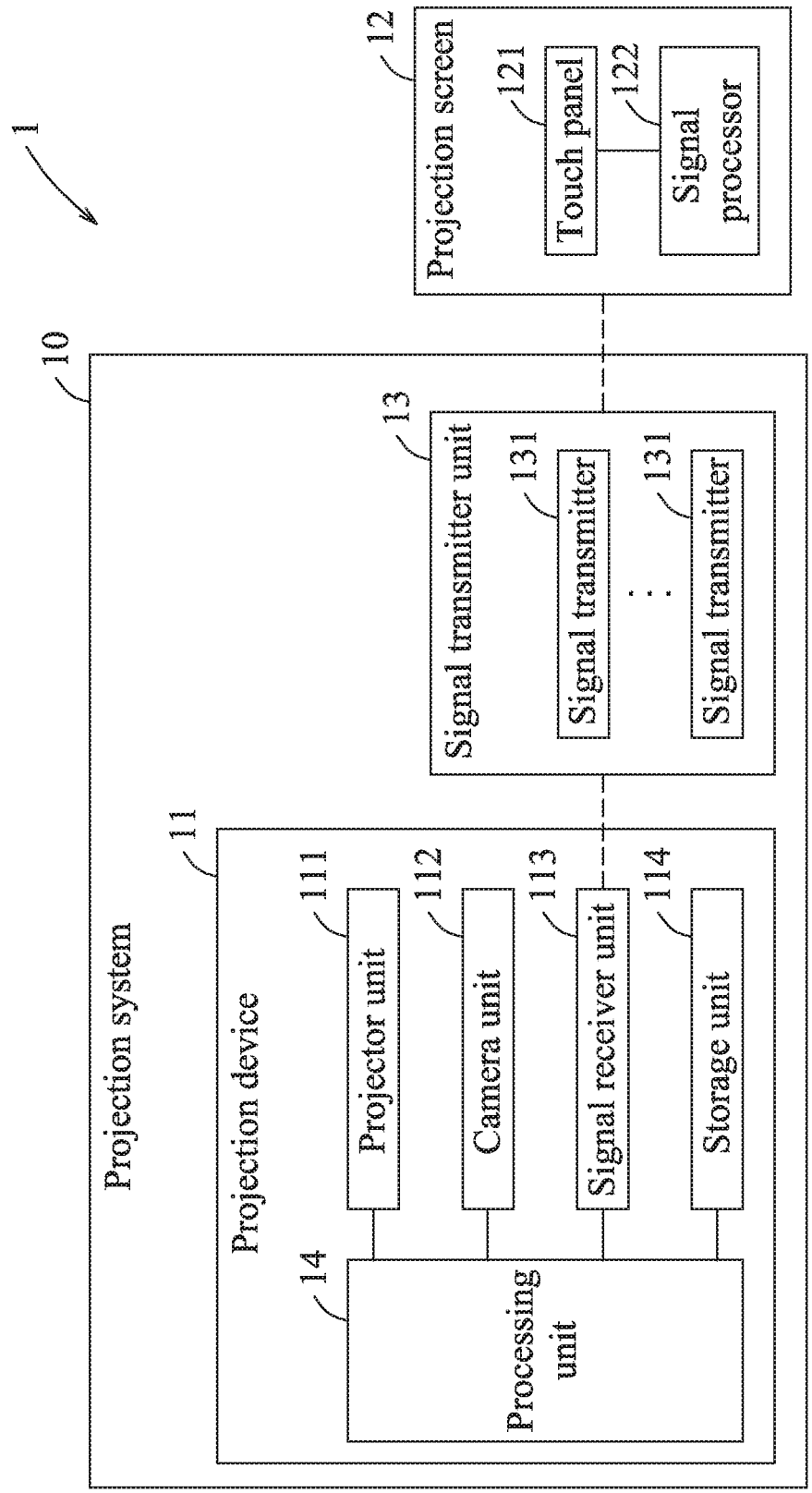
FIG. 1 is a block diagram illustrating a first embodiment of a projection display system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Moreover, the term "electrical connection" described in the specification refers generally to a wired electrical connection between a plurality of electronic devices or equipment or components by means of a conductive material, or a wireless electrical connection by means of wireless signal transmission using wireless communication technology. Further, "electrical connection" as described in the specification also refers generally to a "direct electrical connection" formed by a direct connection between two electronic devices or equipment or components, or an "indirect electrical connection" formed by a connection between two electronic devices or equipment or components via other electronic device(s) or equipment or component(s).

Referring to FIG. 1, a first embodiment of a projection display system 1 includes a projection device 11, a projection screen 12, a signal transmitter unit 13, and a processing unit 14. The projection device 11 includes a projector unit 111, a camera unit 112, a signal receiver unit 113, and a storage unit 114.

In this embodiment, the projector unit 111 is realized as a projector module that includes a light source and a projection lens, the camera unit 112 is realized as a camera module that includes an image sensor and a photographic lens, the signal receiver unit 113 is realized as a wireless receiver unit, and the storage unit 114 is realized as an internal memory component (e.g., a flash memory module, a solid state drive, a hard disk drive, etc.).

To be specific, the signal receiver unit 113 may include an infrared receiver in this embodiment. In other embodiments, the signal receiver unit 113 may conform with, for example, Bluetooth®, Wi-Fi, ZigBee, or other wireless communication techniques, and is not limited to this embodiment. In this embodiment, the projector unit 111, the camera unit 112 and the signal receiver unit 113 are mounted to a body (not shown) of the projection device 11 at the same side (e.g., a front side of the body that is close to (i.e., faces) the projection screen 12) and face the same direction. If a direction that the projector unit 111 faces is defined as a projection direction, the camera unit 112 and the signal receiver unit 113 are mounted to the body of the projection device 11 in such away that the camera unit 112 and the signal receiver unit 113 face the projection direction. As a result, the projector unit 111 projects images in the projection direction, the camera unit 112 captures light coming from a direction opposite to the projection direction to form images, and the signal receiver unit 113 receives signals coming from the direction opposite to the projection direction.

The storage unit 114 stores, for example, an operating system, and multiple setting parameters that are related to the projector unit 111. More specifically, the operating system may be an open-source operating system (e.g., Android) that uses graphical user interface, but this disclosure is not limited in this respect. The setting parameters may be used to adjust projection by the projector unit 111, such as a position, an angle, a dimension, and/or a shape of an image projected by the projector unit 111 (referring to as a projection image hereinafter). Particularly, the setting parameters may include a parameter for setting a horizontal shift of the projection image, a parameter for setting a vertical shift of the projection image, a parameter for setting a rotational angle of the projection image, a parameter for setting a focal length of projection, a parameter for setting a dimension of the projection image, a parameter for keystone adjustment, a parameter for correcting barrel distortion, a parameter for correcting pincushion distortion, etc., but this disclosure is not limited to such.

In this embodiment, the projection screen 12 is realized as a rectangular screen that is made of smart glass and that supports touch operation. In particular, the projection screen 12 of this embodiment includes a touch panel 121, and a signal processor 122 electrically connected to the touch panel 121 for processing signals that are generated in response to touch operation on the touch panel 121. The touch panel 121 may be implemented using, for example, capacitive sensing, resistive sensing, infrared sensing, sound wave sensing, etc., to achieve touch sensing function, but this disclosure is not limited in this respect. In this embodiment, the projection screen 12 further includes a smart film that may be a polymer dispersed liquid crystal (PDLC) layer, and which may be made from, for example, liquid crystal polymer, or cholesteric liquid crystal. The smart film makes the projection screen 12 operable between a transparent state where the projection screen 12 permits transmission of light and an opaque state where the projection screen 12 blocks light from passing therethrough (e.g., reflecting the light or absorbing the light). In more detail, when electric power is applied to the smart film, liquid crystal molecules of the PDLC layer would be forced into alignment along a specific direction, thereby permitting transmission of light. When electric power is not applied to the smart film, the liquid crystal molecules would be disordered, thereby blocking light from passing therethrough. The projection screen 12 is suitable for projection in the opaque state. In some implementations, the projection screen 12 may be operated in a semi-opaque state via adjusting a magnitude of electric power applied to the smart film, but this disclosure is not limited in this respect.

In one embodiment, the projection screen 12 may be realized as a combination of a projection curtain and multiple sensing components (e.g., electrodes, not shown). The sensing components are mounted to the projection curtain for sensing touch operation on the projection curtain. The integration of the projection curtain and the sensing components forms the projection screen 12 that is capable of touch sensing and that supports touch operation. In some embodiments, the projection screen 12 may be realized as an ordinary projection curtain and does not have to include the aforesaid touch panel 121, sensing components, and smart film. That is, the projection screen 12 does not have to support touch sensing and touch operation and does not have to be switchable between the transparent state and the opaque state. Implementations of the projection screen 12 are not limited to this embodiment.

The signal transmitter unit 13 includes a plurality of signal transmitters 131 that are respectively mounted to multiple corners of the projection screen and that are configured to wirelessly output multiple transmitter signals, respectively. In this embodiment the signal transmitter unit 13 is exemplified to include four signal transmitters 131 that are respectively mounted to four corners/vertices of the projection screen 12. For use with the signal receiver unit 113 that is exemplified as including an infrared receiver in this embodiment, the signal transmitters 131 are realized as infrared transmitters. In other embodiments, the signal transmitters 131 may be implemented to conform with other types of wireless communication techniques (e.g., the aforesaid Bluetooth®, Wi-Fi, ZigBee, etc.) that are used by the signal receiver unit 113, and this disclosure is not limited to the techniques used by the signal receiver unit 113 and the signal transmitters 131. In one embodiment, the signal transmitter unit 13 may include only two signal transmitters 131 that are respectively mounted to two corners of the projection screen 12 that form a diagonal of the projection screen 12. In other embodiments, the signal transmitter unit 13 may include three, five, or more signal transmitters 131, as long as there are two signal transmitters 131 placed at two corners of the projection screen 12 that form a diagonal of the projection screen 12, so a number of the signal transmitters 131 is not limited to this embodiment.

The processing unit 14 is electrically connected to the projector unit 111, the camera unit 112, the signal receiver unit 113 and the storage unit 114 of the projection device 11, the signal transmitters 131 of the signal transmitter unit 13, and the signal processor 122 of the projection screen 12 that supports touch operation, but this disclosure is not limited to such. In this embodiment, the processing unit 14 is exemplified as a central processor disposed within the body of the projection device 11, is configured to run the operating system installed in the storage unit 114, and controls the projector unit 111 to project images according to the setting parameters. In other words, this embodiment exemplifies that the processing unit 14 is included in the projection device 11 as shown in FIG. 1, but this disclosure is not limited to such.

In this embodiment, the projection device 11, the signal transmitter unit 13 and the processing unit 14 cooperatively constitute a projection system 10 of the projection display system 1. The processing unit 14 in this embodiment is electrically connected to the projector unit 111, the camera unit 112, the signal receiver unit 113, and the storage unit 114 by wires, and is electrically connected to the signal transmitters 131 and the signal processor 122 via wireless communication, but this disclosure is not limited to such.

Figure 2:
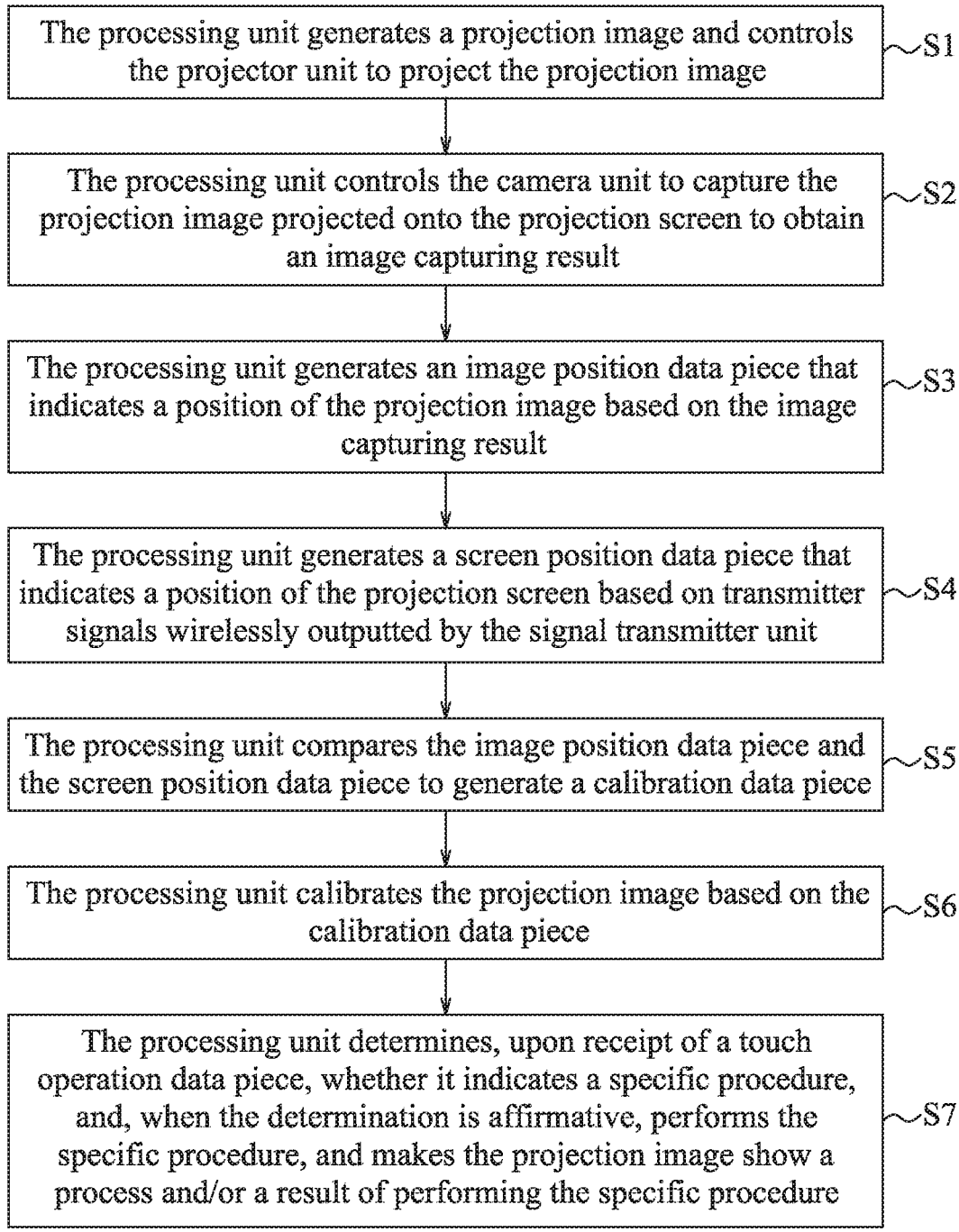
FIG. 2 is a flow chart illustrating an embodiment of a projection method to be implemented by the first embodiment of the projection display system according to this disclosure.

Referring to FIGS. 1 and 2, an embodiment of a projection method according to this disclosure is exemplarily illustrated to be implemented by the projection system 10. The projection method should be performed under a condition that the projection device 11 is spaced apart from and faces the projection screen 12. In other words, the projector unit 111, the camera unit 112 and the signal receiver unit 113 of the projection device 11 all face the projection screen 12. Furthermore, during implementation of the embodiment of the projection method, the projection screen 12 is to be switched to the opaque state.

In step S1, the processing unit 14 generates a projection image and controls the projector unit 111 to project the projection image. Since the projector unit 111 faces the projection screen 12, it is expected that at least a part of the projection image can be projected onto the projection screen 12. For the ease of explaining subsequent steps, it is assumed that the projection image deviates from a centered position relative to the projection screen 12. Step S1 serves as an image projection step for this embodiment and may be automatically executed by the processing unit 14 during a boot process of the projection device 11. Furthermore, the projection image may show a startup screen in step S1, but this disclosure is not limited to such. Then, the flow goes to step S2.

In step S2, when the projector unit 111 is projecting the projection image onto the projection screen 12, the processing unit 14 controls the camera unit 112 to perform image capturing by capturing light coming from the projection screen 12 and acquires an image capturing result from the camera unit 112. The image capturing result is generated by the camera unit 112 capturing an image of the projection image on the projection screen 12 and shows the projection image projected by the projector unit 111 onto the projection screen 2. Then, the flow goes to step S3.

In step S3, the processing unit 14 generates, based on the image capturing result, an image position data piece that indicates a position of the projection image and that includes a plurality of image position coordinate sets that respectively correspond to multiple vertices of the projection image. In this embodiment, the image position data piece includes, for example, four image position coordinate sets that respectively correspond to four vertices of the projection image. Each of the image position coordinate sets represents a position of the corresponding one of the four vertices.

In more detail, the processing unit 14 may generate the image position data piece by, for example, performing image recognition on the image capturing result, so as to identify edges of the projection image in the image capturing result based on changes in color and luminance contrast, followed by identifying the four vertices of the projection image in the image capturing result, and then calculating the image position coordinate sets that respectively correspond to the four vertices. Each of the image position coordinate sets may be a two-dimensional coordinate set in this embodiment and may be a three-dimensional coordinate set in other embodiments; this disclosure is not limited in this respect.

It is noted that the processing unit 14 may calculate the image position coordinate sets with reference to a predetermined reference point that serves as an origin of the coordinate system. The reference point may represent, for example, a position of the camera unit 112 or a position of the signal receiver unit 113, but this disclosure is not limited to such. In some embodiments, the image position data piece may include only two image position coordinate sets that respectively correspond to two vertices of the projection image that form a diagonal of the projection image. In some embodiments, the image position data piece may include three or another number of image position coordinate sets, as long as there are at least two image position coordinate sets respectively corresponding to two vertices of the projection image that form a diagonal of the projection image. Therefore, the implementation of the image position data piece is not limited to this specific embodiment. Steps S2 and S3 cooperatively constitute an image positioning step for this embodiment.

After the processing unit 14 generates the image position data piece, the flow goes to step S4.

In step S4, the processing unit 14 controls the signal transmitters 131 of the signal transmitter unit 13 to respectively and wirelessly output multiple transmitter signals for receipt by the signal receiver unit 113 and generates, based on the transmitter signals received via the signal receiver unit 113, a screen position data piece that indicates a position of the projection screen and that includes a plurality of screen position coordinate sets that respectively correspond to the signal transmitters 131.

In this embodiment, the screen position data piece includes, for example, four screen position coordinate sets that respectively correspond to the four signal transmitters 131. Each of the screen position coordinate sets may be a three-dimensional coordinate set that includes three coordinates and is calculated by the processing unit 14 based on an intensity and a direction of one of the transmitter signals that is wirelessly transmitted by the corresponding one of the signal transmitters 131. The processing unit 14 calculates the image position coordinate sets also with reference to the predetermined reference point. That is, the screen position coordinate sets and the image position coordinate sets are calculated with reference to the same reference point (i.e., the origin of the coordinate system).

It is noted that a number of the screen position coordinate sets corresponds to a number of the signal transmitters 131 and is not limited to four as exemplified in this embodiment. In other embodiments, each of the screen position coordinate sets may be a two-dimensional coordinate set. In some embodiments, the signal transmitter unit 13 may independently transmit the transmitter signals, in which case the signal transmitter unit 13 is not controlled by the processing unit 14. For example, the signal transmitter unit 13 may be operable by a user to make the signal transmitters 131 wirelessly output the transmitter signals, respectively, or be configured to automatically and wirelessly output the transmitter signals when powered on. Accordingly, implementation of the signal transmitter unit 13 is not limited to this embodiment. Step S4 serves as a screen positioning step of this embodiment.

After the processing unit 14 generates the screen position data piece, the flow goes to step S5.

In step S5, the processing unit 14 compares the image position data piece with the screen position data piece and generates a calibration data piece based on the comparison between the image position data piece and the screen position data piece. In this embodiment, the calibration data piece indicates a dimensional difference and a positional difference between the projection image and the projection screen 12. In other embodiments, the calibration data piece may indicate only one of the dimensional difference and the positional difference between the projection image and the projection screen 12, and this disclosure is not limited to this embodiment.

More specifically, in step S5, the processing unit 14 compares the image position coordinate sets of the image position data piece respectively with the screen position coordinate sets. Since the projection image is projected onto the projection screen 12, a distance between the projection device 11 and the projection image can be deemed the same as a distance between the projection device 11 and the projection screen 12. In other words, the projection image and the projection screen 12 have the same depth relative to the projection device 11. If a direction in which the projection device 11 projects images serves as a Z-axis direction in a three-dimensional space, the processing unit 14 may compare the differences between the image position coordinate sets and the respective screen position coordinate sets in an X-axis direction and a Y-axis direction, where the X-axis direction, the Y-axis direction and the Z-axis direction are perpendicular to each other. That is, the processing unit 14 compares a positional difference, an angular difference, and a dimensional difference between the projection image and the projection screen 12 on an X-Y plane that is defined by an X-axis and a Y-axis that extend in the X-axis direction and the Y-direction, respectively. As a result, the processing unit 14 can calculate a horizontal shift, a vertical shift, a rotational angle, and a dimensional ratio of the projection image relative to the projection screen 12. The calibration data piece may thus include a horizontal correction value corresponding to the horizontal shift, a vertical correction value corresponding to the vertical shift, a rotational angle correction value corresponding to the rotational angle, and a magnification correction value corresponding to the dimensional ratio, but this disclosure is not limited thereto.

After the processing unit 14 generates the calibration data piece, the flow goes to step S6.

In step S6, the processing unit 14 adjusts at least one of the setting parameters based on the calibration data piece, so as to reduce at least one of the dimensional difference or the positional difference (i.e., the dimensional difference and/or the positional difference) between the projection image and the projection screen 12. For instance, assuming that the horizontal correction value of the calibration data piece indicates a shift of one unit distance in the right direction, the processing unit 14 may adjust the setting parameters by adding one to the parameter for setting the horizontal shift. As another example, assuming that the rotational angle correction value of the calibration data piece indicates a rotation of two unit angles in the counterclockwise direction, the processing unit 14 may adjust the setting parameters by subtracting two from the parameter for setting the rotational angle. As yet another example, assuming that the magnification correction value of the calibration data piece indicates a magnification of 108%, the processing unit 14 may adjust the setting parameters by multiplying the parameter for setting the dimension by 1.08. However, this disclosure is not limited to those exemplified in this embodiment.

When a length-to-width ratio of the projection image is the same as that of the projection screen 12 (e.g., both being 16:9), the processing unit 14 can adjust the setting parameters to make the projection image completely fit the projection screen 12 in terms of size and position. When the length-to-width ratio of the projection image is different from that of the projection screen 12 (e.g., the length-to-width ratio of the projection image is 4:3, while the length-to-width ratio of the projection screen 12 is 16:9), the processing unit 14 may adjust the setting parameters such that one of the length and the width of the projection image fits the corresponding one of the length and the width of the projection screen 12, while the other one of the length and the width of the projection image does not exceed the other one of the length and the width of the projection screen 12. In other words, the processing unit 14 enlarges the projection image to the greatest extent possible under the condition that the length-to-width ratio of the projection image is not changed and that the projection image does not extend beyond the projection screen 12. In some implementations, the processing unit 14 may adjust the length-to-width ratio of the projection image to be the same as that of the projection screen 12 and then make the size and the position of the projection image fit those of the projection screen 12. However, this disclosure is not limited in this respect.

Steps S5 and S6 cooperatively form an image calibration step of this embodiment.

After the processing unit 14 adjusts the setting parameter (s) based on the calibration data piece, the flow goes to step S7.

In step S7, when the projector unit 111 is projecting the projection image, the processing unit 14 determines, upon receipt from the projection screen 12 of a touch operation data piece that is related to a touch operation on the projection screen 12, whether the touch operation data piece indicates a specific procedure related to the projection image. Upon determining that the touch operation data piece indicates the specific procedure, the processing unit performs the specific procedure and makes the projection image that is being projected by the projector unit 111 show at least one of a process or a result (i.e., the process and/or the result) of performing the specific procedure should the specific procedure be performed.

In this embodiment, the touch operation data piece may be generated by the signal processor 122 of the projection screen 12 based on the touch operation performed on the projection screen 12, and the signal processor 122 provides the touch operation data piece to the processing unit 14 by, for example, wireless communication. The touch operation data piece may include a position of the touch operation on the projection screen 12 (a position on the projection screen 12 where the touch operation was performed) and a type of the touch operation. The position of the touch operation may include one or more coordinate sets that correspond to the touch operation. The type of the touch operation may indicate one of, for example, a single tap gesture, a double tap gesture, a long press gesture, a swipe gesture, a drag gesture, a pinch gesture, and so on, and this disclosure is not limited in this respect.

In step S7, the projection image may show a user interface of the operating system, and the specific procedure that is related to the projection image corresponds to the user interface that is shown in the projection image. When the processing unit 14 receives the touch operation data piece, the processing unit 14 determines whether the touch operation data piece indicates the specific procedure that is related to the user interface based on the position of the touch operation on the projection screen 12 and the type of the touch operation. For example, the processing unit 14 may determine whether there is a virtual object (e.g., a button) at a position of the user interface that corresponds to the position of the touch operation. When the determination is affirmative, the processing unit 14 may further determine whether the type of the touch operation is supported by the virtual object, but this disclosure is not limited in this respect.

In one example, when the processing unit 14 determines that the touch operation data piece indicates that a button in the user interface, which is configured for hiding a window, is pressed, the specific procedure performed by the processing unit 14 may be to hide the corresponding window from the screen. In one example, when the processing unit 14 determines that the touch operation data piece indicates that a picture shown in the user interface is swiped leftward, the specific procedure performed by the processing unit 14 may be to show the next picture in the screen. The mechanism of the processing unit 14 performing the specific procedure that corresponds to the touch operation data piece is similar to those used in conventional touch-control electronic devices, so details thereof are omitted herein for the sake of brevity.

Step S7 is a touch operation processing step in the embodiment. Through this step, users can directly perform touch operation on the projection screen 12, and the projection screen 12 shows the corresponding response. Arrangement (e.g., a range of distribution, quantity, spacing distance, etc.) of the sensing components (e.g., electrodes) of the touch panel 121 may correspond to a dimensional specification of the projection screen 12. The coordinate system used by the signal processor 122 to calculate the position of the touch operation included in the touch operation data piece is related to and can be mirrored to the coordinate system used by the processing unit 14 to calculate the image position coordinate sets and the screen position coordinate sets. As a result, after the image calibration step (namely, steps S5 and S6), not only do the size and the position of the projection image match those of the projection screen 12, but the position of the touch operation calculated by the signal processor 122 can also accurately conform with the dimensional specification of the projection screen 12. The processing unit 14 can thus correctly perform the abovementioned determination and processing based on the touch operation data piece, thereby achieving accurate touch operation, so the user can smoothly use the projection image to perform touch operation.

If the user intends to use the projection image for presentation or speech, he or she may control the content presented in the projection image by directly performing touch operation on the projection screen 12, the user does not need to operate another device (e.g. a computer), and the presentation or speech can go smoother. In comparison to the conventional touch liquid crystal display (LCD) screens that employ color LCD panels which are relatively expensive, this embodiment can effectively save the material cost when a large screen is required.

The first embodiment according to this disclosure is described above. Although the image positioning step (i.e., steps S2 and S3) is performed before the screen positioning step (i.e., step S4) in this embodiment, the image positioning step can be performed after the screen positioning step or can be performed simultaneously with the screen positioning step via multitasking, and this disclosure is not limited to this embodiment. When the projection screen 12 is realized as an ordinary projection curtain that does not support touch operation function, the touch operation processing step (i.e., step S7) may be omitted from the embodiment.

A second embodiment of the projection display system 1 is provided to differ from the first embodiment in the implementation of the processing unit 14.

Figure 3:
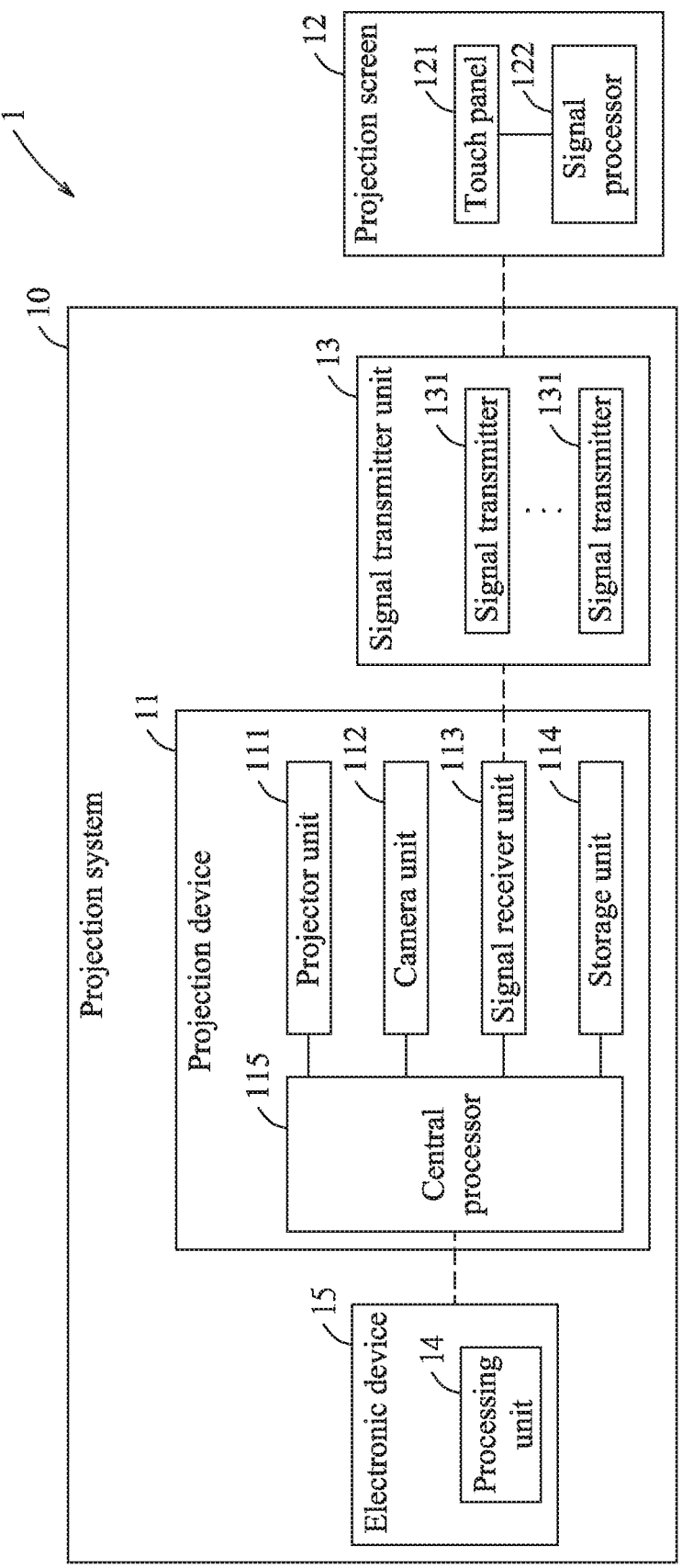
FIG. 3 is a block diagram illustrating a second embodiment of a projection display system according to the disclosure.

Referring to FIG. 3, in the second embodiment, the processing unit 14 is exemplified as a central processor that is included in an electronic device 15 of the projection system 10 and that is capable of communication with a central processor 115 of the projection device 11 via a wireless network. In practice, the electronic device 15 may be, for example, a notebook computer, a desktop computer, a tablet computer or a smartphone, etc., and the electronic device 15 may be installed with an application program for remote control of the projection device 11, so that the user can operate the electronic device 15 to make the projection system 10 implement the projection method proposed herein.

In one implementation of the second embodiment, the processing unit 14 may be constituted by both of the central processor of the electronic device 15 and the central processor 115 of the projection device 11, and step S1 through step S7 of the proposed projection method can be cooperatively performed by the electronic device 15 and the projection device 11. For example, steps S1 through S6 may be performed by the central processor 115 of the projection device 11, and step S7 may be performed by the central processor of the electronic device 15. The cooperation between the electronic device 15 and the projection device 11 may vary as desired and is not limited thereto.

In summary, the processing unit 14 of the projection system 10 generates the calibration data piece based on the image position data piece and the screen position data piece and automatically adjusts the setting parameter(s) of the projection device 11 based on the calibration data piece, so as to reduce at least one of the position difference or the dimensional difference between the projection image and the projection screen 12. Accordingly, even if relative positions of the projection device 11 and the projection screen 12 change, the projection system 10 can automatically calibrate the projection image to fit the projection screen 12 and does not require the user to make adjustments manually.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A projection system for use with a projection screen, comprising:
   a projection device comprising a projector unit, a camera unit, and a signal receiver unit;
   a signal transmitter unit configured to be mounted to the projection screen; and
   a processing unit electrically connected to the projector unit, the camera unit, and the signal receiver unit;

wherein:
   the processing unit is configured to acquire, from the camera unit when the projector unit is projecting a projection image onto the projection screen, an image capturing result generated by the camera unit capturing an image of the projection image on the projection screen and to generate an image position data piece that indicates a position of the projection image based on the image capturing result;
   the processing unit is further configured to wirelessly receive multiple transmitter signals from the signal transmitter unit via the signal receiver unit and to generate a screen position data piece that indicates a position of the projection screen based on the transmitter signals;
   the processing unit is further configured to generate a calibration data piece based on a comparison between the image position data piece and the screen position data piece, the calibration data piece indicating at least one of a dimensional difference or a positional difference between the projection image and the projection screen; and
   the processing unit is further configured to adjust at least one setting parameter that is related to the projector unit based on the calibration data piece, so as to reduce the at least one of the dimensional difference or the positional difference between the projection image and the projection screen.

2. The projection system of claim 1, wherein:
the signal transmitter unit comprises a plurality of signal transmitters configured to be respectively mounted to multiple corners of the projection screen;
the image position data piece comprises a plurality of image position coordinate sets that respectively correspond to multiple vertices of the projection image; and
the transmitter signals are wirelessly transmitted by the signal transmitters, respectively, the screen position data piece comprises a plurality of screen position coordinate sets that respectively correspond to the signal transmitters, and each of the screen position coordinate sets is calculated by the processing unit based on an intensity and a direction of one of the transmitter signals that is wirelessly transmitted by the corresponding one of the signal transmitters.

3. The projection system of claim 1, wherein:
the projection screen supports touch operation; and
after the processing unit has adjusted the at least one setting parameter and when the projector unit is projecting the projection image, the processing unit is further configured to perform a specific procedure related to the projection image upon receipt from the projection screen of a touch operation data piece that is related to a touch operation on the projection screen and upon determining that the touch operation data piece indicates the specific procedure.

4. The projection system of claim 3, wherein:
the processing unit is further configured to generate the projection image and to control the projector unit to project the projection image before generating the image position data piece and the screen position data piece;
after the processing unit has adjusted the at least one setting parameter based on the calibration data piece, the projection image shows a user interface;
the processing unit is further configured to determine whether the touch operation data piece indicates the specific procedure related to the user interface based on a position of the touch operation on the projection screen and a type of the touch operation that are comprised in the touch operation data piece; and the processing unit is further configured to make the projection image show at least one of a process or a result of performing the specific procedure when the specific procedure is being performed.

5. A projection method implemented by a projection system, the projection system comprising a projection device, a signal transmitter unit configured to be mounted to a projection screen, and a processing unit, the projection device comprising a projector unit electrically connected to the processing unit, a camera unit and a signal receiver unit, the projection method comprising:

an image positioning step that comprises:
by the processing unit, acquiring, from the camera unit when projecting a projection image onto the projection screen, an image capturing result generated by the camera unit capturing an image of the projection image on the projection screen, and generating an image position data piece that indicates a position of the projection image based on the image capturing result;

a screen positioning step that comprises:
by the processing unit, wirelessly receiving multiple transmitter signals from the signal transmitter unit via the signal receiver unit, and generating a screen position data piece that indicates a position of the projection screen based on the transmitter signals; and an image calibration step that comprises:
by the processing unit, generating a calibration data piece based on a comparison between the image position data piece and the screen position data piece, the calibration data piece indicating at least one of a dimensional difference or a positional difference between the projection image and the projection screen; and by the processing unit, adjusting at least one setting parameter that is related to the projector unit based on the calibration data piece, so as to reduce the at least one of the dimensional difference or the positional difference between the projection image and the projection screen.

6. The projection method of claim 5, wherein:
the signal transmitter unit comprises a plurality of signal transmitters that are respectively mounted to multiple corners of the projection screen;
in the image positioning step, the image position data piece comprises a plurality of image position coordinate sets that respectively correspond to multiple vertices of the projection image; and
in the screen positioning step, the transmitter signals are respectively and wirelessly transmitted by the signal transmitters, the screen position data piece comprises a plurality of screen position coordinate sets that respectively correspond to the signal transmitters, and each of the screen position coordinate sets is calculated by the processing unit based on an intensity and a direction of one of the transmitter signals that is transmitted by the corresponding one of the signal transmitters.

7. The projection method of claim 5, wherein:
the projection screen supports touch operation; and
the projection method further comprises a touch operation processing step after the image calibration step, the touch operation processing step comprising:

by the processing unit and when the projector unit is projecting the projection image, performing a specific procedure related to the projection image upon receipt from the projection screen of a touch operation data piece that is related to a touch operation on the projection screen and upon determining that the touch operation data piece indicates the specific procedure.

8. The projection method of claim 7, further comprising an image projection step before the image positioning step and the screen positioning step, the image projection step comprising:

by the processing unit, generating the projection image and controlling the projector unit to project the projection image;

wherein, in the touch operation processing step, the projection image shows a user interface, and the touch operation processing step further comprises:

by the processing unit, determining whether the touch operation data piece indicates the specific procedure related to the user interface based on a position of the touch operation on the projection screen and a type of the touch operation that are comprised in the touch operation data piece; and by the processing unit, making the projection image show at least one of a process or a result of performing the specific procedure when the specific procedure is being performed.

9. A projection display system, comprising:
a projection device comprising a projector unit, a camera unit, and a signal receiver unit;
a projection screen;
a signal transmitter unit mounted to the projection screen; and
a processing unit electrically connected to the projector unit, the camera unit, and the signal receiver unit;
wherein:
the processing unit is configured to acquire, from the camera unit when the projector unit is projecting a projection image onto the projection screen, an image capturing result generated by the camera unit capturing an image of the projection image on the projection screen, and to generate an image position data piece that indicates a position of the projection image based on the image capturing result;
the processing unit is further configured to wirelessly receive multiple transmitter signals from the signal transmitter unit via the signal receiver unit and to generate a screen position data piece that indicates a position of the projection screen based on the transmitter signals;
the processing unit is further configured to generate a calibration data piece based on a comparison between the image position data piece and the screen position data piece, the calibration data piece indicating at least one of a dimensional difference or a positional difference between the projection image and the projection screen; and
the processing unit is further configured to adjust at least one setting parameter that is related to the projector unit based on the calibration data piece, so as to reduce the at least one of the dimensional difference or the positional difference between the projection image and the projection screen.

10. The projection display system of claim 9, wherein:
the projection screen supports touch operation; and the projection screen is operable to switch between a transparent state where the projection screen permits transmission of light and an opaque state where the projection screen blocks light from passing therethrough.

11. The projection display system of claim 9, wherein:

the signal transmitter unit comprises a plurality of signal transmitters that are respectively mounted to multiple corners of the projection screen;

the image position data piece comprises a plurality of image position coordinate sets that respectively correspond to multiple vertices of the projection image; and the transmitter signals are respectively and wirelessly transmitted by the signal transmitters, the screen position data piece comprises a plurality of screen position coordinate sets that respectively correspond to the signal transmitters, and each of the screen position coordinate sets is calculated by the processing unit based on an intensity and a direction of one of the transmitter signals that is transmitted by the corresponding one of the signal transmitters.

12. The projection display system of claim 9, wherein:

the projection screen supports touch operation; and after the processing unit has adjusted the at least one setting parameter and when the projector unit is projecting the projection image, the processing unit is further configured to perform a specific procedure related to the projection image upon receipt from the projection screen of a touch operation data piece that is related to a touch operation on the projection screen and upon determining that the touch operation data piece indicates the specific procedure.

13. The projection display system of claim 12, wherein:

the processing unit is further configured to generate the projection image and to control the projector unit to project the projection image before generating the image position data piece and the screen position data piece;

after the processing unit has adjusted the at least one setting parameter based on the calibration data piece, the projection image shows a user interface;

the processing unit is further configured to determine whether the touch operation data piece indicates the specific procedure related to the user interface based on a position of the touch operation on the projection screen and a type of the touch operation that are comprised in the touch operation data piece; and the processing unit is further configured to make the projection image show at least one of a process or a result of performing the specific procedure when the specific procedure is being performed.

* * * * *